United States Patent [19]

Murdock

[11] 4,221,094

[45] Sep. 9, 1980

[54] REFLECTIVE INSULATION ASSEMBLY

[75] Inventor: Bradley R. Murdock, Lancaster, Ohio

[73] Assignee: Diamond Power Specialty Corporation, Lancaster, Ohio

[21] Appl. No.: 880,259

[22] Filed: Feb. 22, 1978

[51] Int. Cl.² ............................................. E04B 5/57
[52] U.S. Cl. .................................... 52/474; 428/178; 52/800
[58] Field of Search ......................... 428/116, 182–184, 428/178; 52/795–801, 351, 363, 474; 29/432, 155 R

[56] References Cited

U.S. PATENT DOCUMENTS

| | | | |
|---|---|---|---|
| 683,060 | 9/1901 | New | 52/407 |
| 2,108,795 | 2/1938 | Budd | 52/800 |
| 2,644,777 | 7/1953 | Havens | 428/116 |
| 3,030,703 | 4/1962 | Wirsing | 428/116 |
| 3,282,011 | 11/1966 | Meserile et al. | 52/800 |
| 3,349,525 | 10/1967 | Payne | 52/800 |
| 4,033,464 | 7/1977 | Carr | 206/493 |

FOREIGN PATENT DOCUMENTS 753204  8/1933  France .................................. 52/249

Primary Examiner—James L. Ridgill, Jr.
Attorney, Agent, or Firm—Matas, Vytas R.; Joseph M. Maguire

[57] ABSTRACT

A highly flexible reflective insulation inner assembly is provided which spaces a pair of flexible reflective insulation sheets while also sealing a volume of space therebetween. To accomplish this a corrugated strip of material is mounted on its edge between the pair of flexible reflective insulation sheets all along the perimeter of the two sheets. The corrugated strip seals and spaces the two flexible sheets while allowing them to be curved and bent to conform to the shape of the more rigid inner and outer case assembly which mounts on the body to be insulated to thus provide a flexible and efficient thermal insulation inner assembly. In vertical mounting of such reflective insulation inner assemblies the height of the enclosed volume is maintained at substantially twelve inches to minimize convective heat transfer thereby.

9 Claims, 7 Drawing Figures

REFLECTIVE INSULATION ASSEMBLY

BACKGROUND OF THE INVENTION

1. Field of the Invention

This invention relates generally to thermal insulation assemblies and particularly to metallic thermal insulation assemblies such as reflective insulation assemblies used in insulating nuclear reactor applications.

2. Description of the Prior Art

Reflective insulation is used to encase the main body and associated piping of nuclear reactors to minimize heat loss therefrom. Reflective insulation is formed in spaced stacks having a plurality of thin Aluminum or Stainless Steel sheets. These spaced sheets are then encased between thicker and more structurally sound inner and outer cases. The encased stacks are custom formed to the contours of the more rigid inner and outer cases which are formed to conform to the contours of the reactor and associated piping and hence require the joining together of variously contoured encased stacks of reflective insulation of various sizes around the reactor.

Since the heat insulating ability of the stacks depends upon minimizing heat transfer by maintaining spaced zones between the reflective sheets, any compression of the stacks will press the sheets together between the spaced zones impairing the insulating efficiency of the stack. Such compression usually occurs along an edge of the stack when assemblers grab the stack by the end and squeeze together the thin sheets of reflective insulation. To prevent this a strong spacer such as a spacing clip is required to maintain the structural integrity of the stack during the various handling and assembly operations. The spacer also has to support the edge of the stack to prevent the shifting of individual sheets within the stack. Clips are known which provide such a spacing. An example of such clips may be seen in U.S. Pat. No. 4,033,464 entitled "CLIP FOR REFLECTIVE INSULATION." Such clips, however, are localized in their application and usually tie together the edges of the reflective insulation stack. In cases where an initially flat pack of flexible insulation sheets is curved around a body to be insulated a problem may occur when such clips are used. The sheets nearest the curved body to be insulated have a smaller distance to cover than the sheets furthest away. Since the edge of the pack is tied together by the end clips, the sheets nearest the insulated body will tend to corrugate while the sheets furthest from the insulated body will tend to stretch into a straight line between the edge clips since the clip prevents the sheets from overlapping. The result becomes a stack wherein spacing between sheets becomes various in thicknesses and in spots actual contact between certain sheets may occur to short circuit insulation quality.

For maximum insulation efficiency the volume between sheets must also be sealed to eliminate convective heat transfer. Prior art insulation systems used rigid closures to seal the volumes between sheets. An example of such closures may be found in U.S. Pat. No. 3,282,011 entitled "THERMAL INSULATION STRUCTURE." However the closures disclosed therein are rigid and thus eliminate one degree of flexibility of the insulation inner assembly since the inner assembly may not be curved along the rigid closure.

From the foregoing it is seen that there is no prior art reflective insulation assembly which can simultaneously space and seal the individual sheets of reflective insulation while maintaining the required flexibility of the assembly to allow it to be curved around a body without impairing the spacing between sheets or the integrity of the seal between the same sheets.

SUMMARY OF THE INVENTION

The present invention solves the problems associated with the known prior art devices as well as others by providing a combination sealer and spacer assembly for reflective insulation sheets which is also highly flexible. This is accomplished by providing a corrugated strip of material mounted on its edge along the entire perimeter of the reflective insulation sheet. A second reflective insulation sheet is then located on top of the corrugated strip of material to provide not only a continuous spacer along the entire perimeter of the two reflective insulation sheets, but also providing a sealed volume of space between the pair of reflective insulation sheets. The corrugated aspect of the edge-mounted strip allows the pair of reflective insulation sheets to be bent in either the vertical or the horizontal plane without impairing the spacing between the sheets. The corrugated strip would merely act as an accordion bellows or a fan to expand the most at the greater radius.

In a specific embodiment of the present invention, the applicant provides a vertically mounted reflective insulation panel assembly wherein the vertical height of the volume enclosed by the corrugated strips of material mounted on its edge between a pair of reflective insulation panels is limited to a height of substantially 12 inches to minimize convective heat transfer thereby. The Applicant has found that for vertically mounted reflective insulation panel assemblies having a spacing between liners of approximately ¼ to ½ of an inch that an optimum tradeoff is accomplished between limiting convective heat transfer without substantially increasing conductive heat transfer between liners due to the added convection barriers by maintaining the vertical height of enclosed spaces between liners at substantially 12 inches.

In view of the foregoing, it will be appreciated that one aspect of the present invention is to provide a combination sealer and spacer assembly for reflective insulation sheets or liners.

Another aspect of the present invention is to provide a vertically mounted reflective insulation panel assembly having minimal heat transference.

These and other aspects of the present invention will become clearer after a review of the description of the preferred embodiment considered in conjunction with the accompanying drawings.

DESCRIPTION OF THE PREFERRED EMBODIMENT

Figure 1:
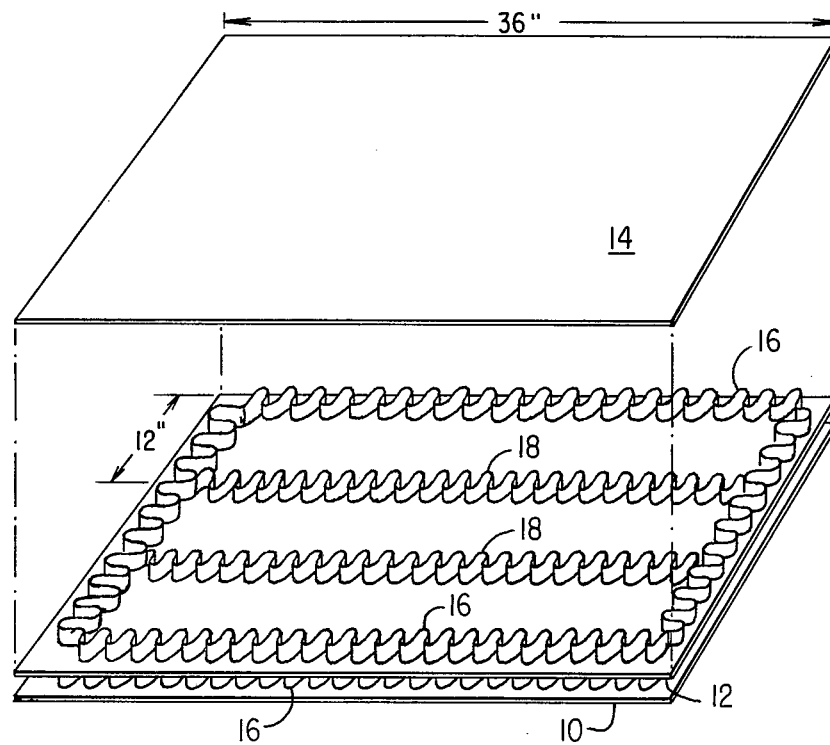
FIG. 1 is a perspective view of three reflective insulation liners having the combination sealer and spacer assemblies mounted therebetween.

Referring now to the drawings wherein the showings are intended to depict a preferred embodiment of the present invention but not to limit the invention thereto, FIG. 1 shows a series of flexible reflective insulation sheets or liners 10, 12, 14 having a continuous strip of corrugated material 16 laid along its edge between individual sheets 10 and 12 and 12 and 14. Each liner 10, 12 and 14 is made from approximately 0.004 inch thick Stainless Steel material making each of the liners 10, 12 and 14 highly flexible and light. The liners 10, 12 and 14 are approximately 36 inches square. The corrugated strip 16 is made from 0.003 inch thick Stainless Steel material and which is approximately 0.33 inches wide and tightly corrugated. When the corrugated strip 16 is laid along its edge, a space of approximately ⅓ of an inch is accurately and easily maintained between adjacent liners 10 and 12 and 12 and 14. The same corrugated strip 16 not only maintains an accurate spacing between liners but also encloses a volume of space between adjacent liners bounded within the perimeter of the corrugated strip. This sealing of a volume of space prevents convective heat transfer and improves the thermal insulation qualities of any insulating assembly manufactured from such reflective insulation liners.

As will be discussed in more detail later, the Applicant has found that when an insulating assembly using such spaced and sealed liners 10, 12 and 14 is mounted in a vertical direction thermal insulating qualities are enhanced if the vertical height of the volume enclosed by the corrugated strip 16 is maintained at approximately at 12 inch height. Thus, corrugated spacers 18 may be horizontally mounted every 12 inches along the width of the panels or liners 10 and 12 every 12 inches.

Figures 2, 2A:
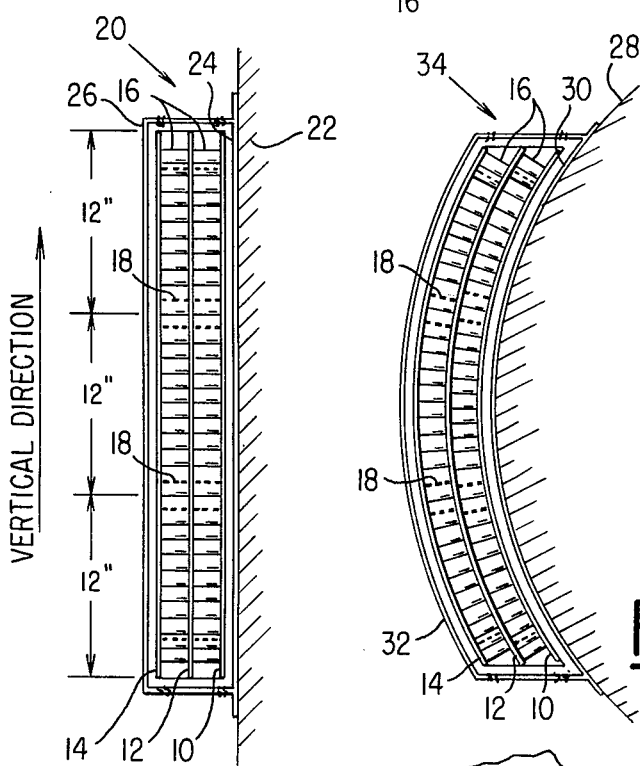
FIG. 2 is a side view of a vertically mounted reflective insulation panel assembly utilizing the sealer and spacer assembly of the present invention.
FIG. 2A shows a reflective insulation panel assembly utilizing the combination sealer and spacer assembly of the present invention mounted along a curved surface.

Turning now to FIG. 2, it will be seen that the liners such as 10, 12 and 14 spaced and sealed by the combination sealer and spacer corrugated strip 16 and 18 mounted within a more rigid case enclosure 20 which is then mounted to a body 22 to be insulated. The enclosure 20 will usually have an inner case 24 of a thicker and more rigid material such as 0.019 inch thick Stainless Steel or Aluminum. Any number of spaced and sealed liners such as 10, 12 and 14 may be mounted within such an inner case 24 depending on the amount of insulating required. For purposes of clarity, the present enclosure 20 is shown to have only the liners 10, 12 and 14 mounted therein. The inner case 24 is covered with an outer case 26 to completely enclose 20 and to seal the spaced liners 12, 14 and 10 therein. It will be understood that the corrugated strip 16 and the spacers 18 need to be fastened only to one of the liners, preferably the bottom liner with the top liner being free to move along the surface of the top edge of the corrugated strip 16 and the spacer 18. Thus, liner 10 will have the corrugated strip 16 and the spacers 18 attached thereto while the liner 12 will be free to move along the corrugated strip 16 and the spacers 18. The other side of the liner 12 will have another set of corrugated strips 16 and spacers 18 mounted thereto while the liner 14 will be free to move along the top edges of the corrugated strip and spacers. The movement of the liners 12 and 14 along the tops of the affixed corrugated strips and spacers is of course limited by the sides of the inner case 24.

As may be best seen in FIG. 2, in situations where the enclosure 20 is used to insulate a body 22 along a vertical direction, the spacers 18 are mounted at approximately every 12 inches of vertical height. The Applicant has found that this type of a spacing provides him with improved insulating qualities with a minimal use of spacer 18 material.

Figure 3:
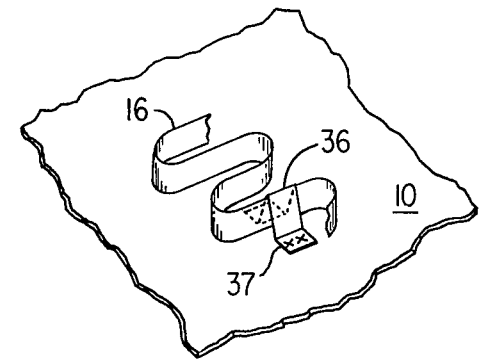
FIG. 3 depicts one method of fastening the combination sealer and spacer assembly of the present invention to a reflective insulation panel.
Figure 4:
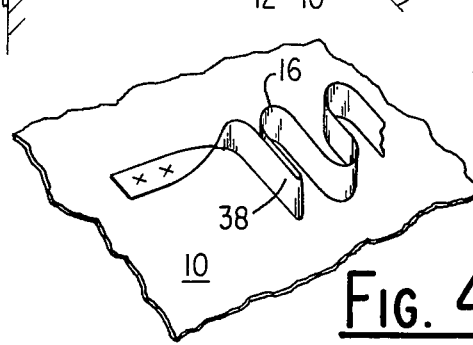
FIGS. 4 and 4A show a second method of fastening the combination sealer and spacer assembly to a reflective insulation panel.
Figure 4A:
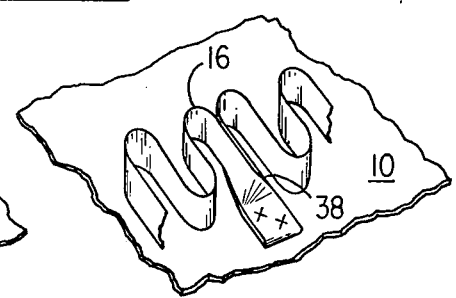

The flexible nature of this type of a liner construction utilizing the sealing and spacing abilities of the edge-mounted corrugated strip 16 becomes especially useful in insulating a radial body 28. As is seen in FIG. 2A, a curved inner case 30 is made to conform to the curvature of the body 28. The initially flat liners 10, 12 and 14 are flexible and will easily conform to the curvature of the inner case 30. The corrugated strip 16 mounted to liner 10 will fan out at the top face wherein liner 12 is located. Its ability to fan out will not be impaired by liner 12 since it is not attached to the corrugated strip 16 of liner 10 but lays on the surface thereof. Similarly, the corrugated strip 16 attached to liner 12 will fan out but will not be impaired by the liner 14. Nevertheless, the spacing between liners will be uniformly maintained as well as the seal of the volume enclosed within the periphery of the corrugated strip 16 will not lose its integrity because of the compatible fit of the liners to the corrugated strip spacer sealers 16. An outer case 32 covers the inner case 30 to complete the enclosure 34. Turning to FIGS. 3 and 4, it will be seen that some known ways of fastening the corrugated strip 16 to a face of a liner such as 10 includes the spot-welding of a triangular clip 36 having a pair of flat surfaces 37 extending from the triangle 36 to the face of the liner 10. Clearly, this triangular clip 36 could be attached to the liner 10 by a mechanical rivet or staple where spot-welding becomes impractical.

A portion of the corrugated strip may be manipulated to provide its own means of fastening to the liner 10. As is best seen in FIG. 4, two portions of the corrugated strip 16 are squeezed together to form an overlapping area 38. This overlapping area 38 may then be bent or twisted until it is perpendicular to the rest of the corrugated strip 16 and lies in a flat plane on the liner 10. The twisted overlapping portion 38 may now be spot-welded or riveted or stapled to the liner 10. The critical point is to provide enough length to the overlapping area 38 so as to maintain the edge of the corrugated strip 16 at a constant height. Any deformation of the wall of the corrugated strip 16 would provide a low spot through which the volume sealed between adjacent liners by the corrugated strip 16 would be free to escape and induce convective heat transfer.

Regardless of which fastening method is used, the only criteria is to provide just sufficient fastening to maintain the corrugated strip 16 along the periphery of the liner. Clearly, the mentioned fastening methods are also used for the spacers 18.

Figure 5:
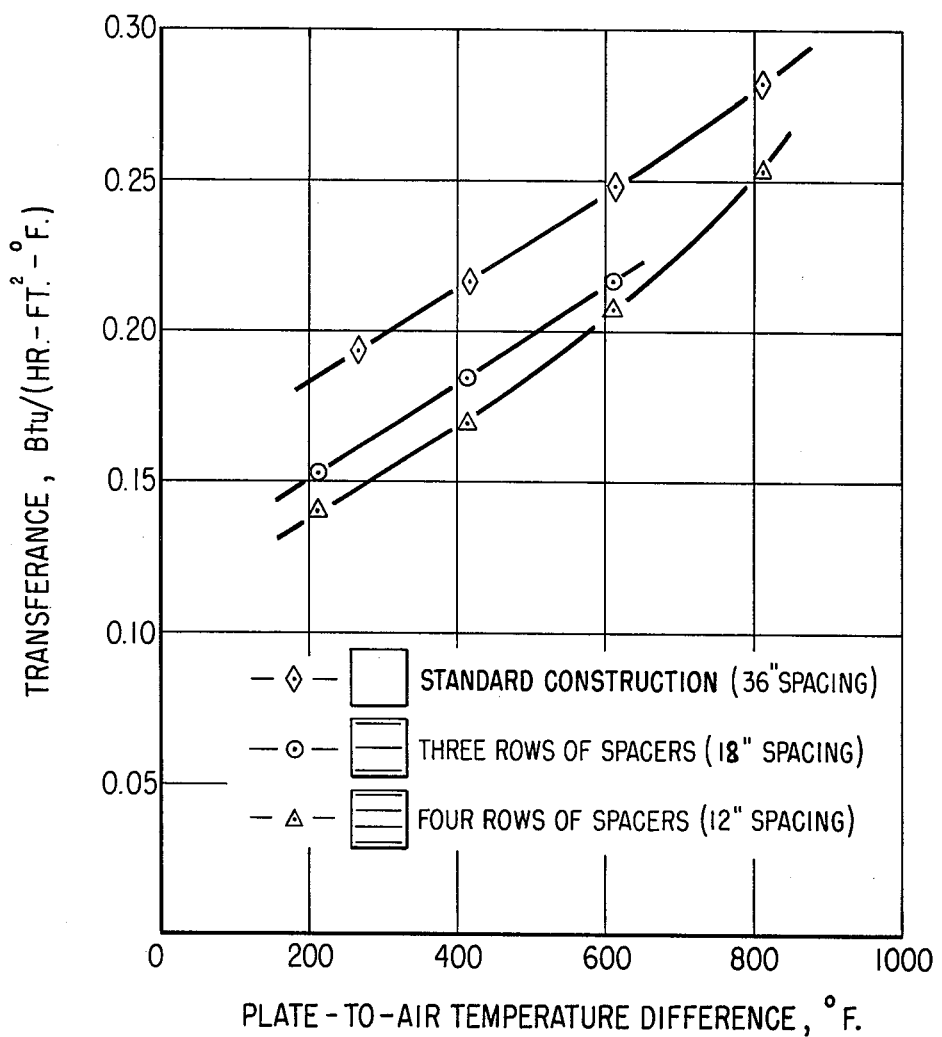
FIG. 5 is a curve of transference in Btu's per hour-square foot-degrees Fahrenheit versus temperature difference in degrees Fahrenheit for various vertical height spacings in a vertically mounted reflective insulation panel assembly of the present invention.

As was mentioned earlier, the applicant has found that in vertical applications of the forementioned insulating assemblies a volume height of 12 inches is optimum. As may be best seen in FIG. 5, tests of transference versus temperature difference were made on a typical thermal insulation assembly having a plurality of liners enclosed within an inner and outer case enclosure with a spacing between liners of approximately ¼ to ½ of an inch. Each liner was approximately 36 inches square. Vertical spacings of 18 inches and 12 inches were attempted by having respectively, 3 spacers, and 4 spacers mounted to the same enclosure between each of the liners. As may be seen from the curve of FIG. 5, the insulating quality of the enclosure was good when 3 spacers 18 were added between each of the liners as shown to provide an 18 inch spacing between spacers 18. Adding another spacer 18 to have 4 rows of spaces or a spacing of 12 inches between spacers 18 provided little improvement in insulating quality. From this it may be seen that a further narrowing of the spacing or vertical height between spacers 18 would become a diminishing return situation where the additional spacers 18 may start increasing conductive heat transfer as well as the added cost of material and labor in adding the spacers 18 not compensating for any possible improvement in insulating quality.

Certain modifications and improvements will occur to those skilled in the art upon reading this Specification. It will be understood that all such improvements and modifications have been deleted herein for the sake of conciseness and readability but are properly intended to be within the scope of the claims.

What I claim is:

1. A reflective insulation assembly intended to be mounted on a body to be insulating comprising:
    a first sheet of reflective insulation;
    a second sheet of reflective insulation; and
    a corrugated strip of material mounted on its edge between said first and said second sheet of reflective insulation along the entire perimeter of said first and second sheets of reflective insulation to thereby space said first and second sheets of reflective insulation and enclose a sealed volume of space between said first and said second sheets of reflective insulation and secured to said first sheet of reflective insulation;
    means retaining said second sheet of reflective insulation against said corrugated trip of material and said first sheet of reflective insulation.

2. A reflective insulation assembly as set forth in claim 1 including means for limiting the vertical height of the volume enclosed between said first and said second sheet of reflective insulation to minimize convective heat transfer within the enclosed volume.

3. A reflective insulation assembly as set forth in claim 1 wherein said enclosure means includes a series of corrugated strips of material parallel mounted on their edges between said first and said second sheet of reflective insulation to divide the enclosed volume therebetween into separate enclosed volumes having a spacing of substantially 12 inches.

4. A reflective insulation assembly as set forth in claim 3 including an outer case assembly mounted on the body to be insulated and having said spaced first and second sheets of reflective insulation located therein.

5. A reflective insulation assembly as set forth in claim 4 wherein said outer case assembly is a substantially flat assembly and wherein said first and said second sheets of reflective insulation are substantially flat.

6. A reflective insulation assembly as set forth in claim 4 wherein said outer case assembly is substantially curved and said first and said second sheets of reflective insulation are mounted therein to conform to the curve of the outer case assembly.

7. A combination sealer and spacer assembly for reflective insulation sheets comprising:
    a first reflective insulation sheet;
    a corrugated strip of material mounted on its edge along the perimeter of said first reflective insulation sheet by a series of clips, each clip having a triangular structure extending over the height of said corrugated strip at one point along said corrugated strip and having flat leg structures extending from the base of the triangular structure fastened to said first reflective insulation sheet to thereby retain said corrugated strip to said first sheet of reflective insulation; and
    a second reflective insulation sheet located on said corrugated strip of material to be spaced from said first sheet of reflective insulation by said corrugated strip of material and to thereby seal a volume of space between said first and second sheets of reflective insulation within the perimeter of said corrugated strip of material.

8. An assembly as set forth in claim 7 including corrugated spacer means extending horizontally across said first reflective insulation sheet to provide an enclosed volume between said first and second reflective insulation sheet having a height of substantially 12 inches whenever said first and second reflective insulation sheets are mounted in a vertical manner and spaced between ¼" and ½".

9. An assembly as set forth in claim 8 wherein said corrugated spacer means includes a second strip of corrugated material mounted along its edge to said first sheet of reflective insulation to be substantially 12 inches from said corrugated strip mounted along the top edge of said first sheet of reflective insulation.

* * * * *